United States Patent
Aumont et al.

(10) Patent No.: US 7,237,388 B2
(45) Date of Patent: Jul. 3, 2007

(54) ASSEMBLY COMPRISING A GAS TURBINE COMBUSTION CHAMBER INTEGRATED WITH A HIGH PRESSURE TURBINE NOZZLE

(75) Inventors: Caroline Aumont, Paris (FR); Eric Conete, Merignac (FR); Mario De Sousa, Cesson la Foret (FR); Didier Hernandez, Quiers (FR)

(73) Assignee: Snecma, Paris (FR)

( * ) Notice: Subject to any disclaimer, the term of this patent is extended or adjusted under 35 U.S.C. 154(b) by 204 days.

(21) Appl. No.: 11/153,356

(22) Filed: Jun. 16, 2005

(65) Prior Publication Data
US 2006/0032237 A1 Feb. 16, 2006

(30) Foreign Application Priority Data
Jun. 17, 2004 (FR) ................... 04 06595

(51) Int. Cl.
F23R 3/42 (2006.01)
(52) U.S. Cl. .......................... 60/796; 60/753
(58) Field of Classification Search ................. 60/752, 60/753, 796, 798, 800
See application file for complete search history.

(56) References Cited

U.S. PATENT DOCUMENTS

| | | | |
|---|---|---|---|
| 2,420,135 A | 5/1947 | Henning | |
| 5,645,398 A | 7/1997 | Benoist et al. | |
| 6,668,559 B2 * | 12/2003 | Calvez et al. | 60/796 |
| 6,675,585 B2 * | 1/2004 | Calvez et al. | 60/796 |
| 6,679,062 B2 | 1/2004 | Conete et al. | |
| 6,823,676 B2 | 11/2004 | Conete et al. | |
| 2004/0240992 A1 | 12/2004 | Bongrand et al. | |

FOREIGN PATENT DOCUMENTS

| | | |
|---|---|---|
| DE | 43 23 706 A1 | 1/1995 |
| EP | 0 161 203 A1 | 11/1985 |
| EP | 1 152 191 A2 | 11/2001 |
| FR | 692 826 A | 11/1930 |
| FR | 2 728 016 A1 | 6/1996 |
| FR | 2 825 780 A1 | 12/2002 |
| FR | 2 825 787 A1 | 12/2002 |
| FR | 2 831 600 A1 | 5/2003 |
| GB | 1 089 660 A | 11/1967 |

* cited by examiner

Primary Examiner—L. J. Casaregola
(74) Attorney, Agent, or Firm—Rothwell, Figg, Ernst & Manbeck

(57) ABSTRACT

The high pressure turbine nozzle is mechanically connected to a downstream end portion of the combustion chamber and inner and outer connection ferrules connect the combustion chamber and turbine nozzle assembly to inner and outer metal shrouds in order to hold said assembly between the shrouds. Locking members are provided to prevent the turbine nozzle from turning about its axis relative to at least one of the metal shrouds so as to prevent the forces that are exerted on the turbine nozzle vanes by the flow of gas coming from the chamber being taken up by the portions of the connection ferrules that extend between the combustion chamber and turbine nozzle assembly and the metal shrouds.

9 Claims, 4 Drawing Sheets

ASSEMBLY COMPRISING A GAS TURBINE COMBUSTION CHAMBER INTEGRATED WITH A HIGH PRESSURE TURBINE NOZZLE

BACKGROUND OF THE INVENTION

The invention relates to gas turbines, in particular for airplane engines or industrial turbines. More particularly, it relates to an assembly comprising a combustion chamber integrated with a high pressure turbine nozzle.

In a gas turbine comprising an annular combustion chamber, proposals have already been made to mount the high pressure (HP) turbine nozzle constituting the inlet stage of the turbine by connecting it mechanically to the downstream end portion of the combustion chamber (throughout this application the terms "upstream" and "downstream" are used relative to the flow direction of the gas stream through the combustion chamber and the nozzle). The assembly constituted by the combustion chamber and the HP turbine nozzle can then be supported by connection ferrules, themselves connected to inner and outer metal shrouds.

Such a disposition makes it possible to ensure better continuity for the gas flow stream at the interface between the combustion chamber and the turbine nozzle, thus enabling sealing to be provided more easily at this interface, in comparison with a disposition in which the combustion chamber and the HP turbine nozzle are separately connected to the inner and outer metal shrouds.

A combustion chamber having a turbine nozzle integrated at its downstream end portion is disclosed in French patent No. FR 2 825 787. The combustion chamber is made of ceramic matrix composite (CMC) material and the assembly comprising the combustion chamber and the sectorized HP turbine nozzle is held between the inner and outer metal shrouds by means of flexible metal connection ferrules which are sectorized so as to enable them to accommodate the relative displacements due to the large differences between the coefficients of thermal expansion of metal and of ceramic composite material.

Although integrating the HP turbine nozzle with the combustion chamber presents the above-mentioned advantages, it nevertheless also presents the following problem. The HP turbine nozzle comprises a plurality of stationary vanes situated in the gas flow stream. The turning force induced by the gas flow on the vanes is taken up by the connection ferrules which must therefore be dimensioned for this purpose, while nevertheless retaining the ability to deform when they interconnect members made of materials having coefficients of expansion that are very different.

OBJECT AND BRIEF SUMMARY OF THE INVENTION

An object of the invention is to provide a solution to that problem, and for this purpose the invention provides a gas turbine comprising:

an annular combustion chamber;
a high pressure turbine nozzle having a plurality of stationary vanes distributed around an axis coinciding with the axis of the combustion chamber, the turbine nozzle being mechanically connected to a downstream end portion of the combustion chamber;
inner and outer metal shrouds between which the assembly constituted by the combustion chamber and the turbine nozzle is housed;
inner and outer connection ferrules connecting the combustion chamber and turbine nozzle assembly respectively to the inner and outer metal shrouds in order to hold said assembly between the shrouds; and
locking members preventing the turbine nozzle from turning about its axis relative to at least one of the metal shrouds, so as to avoid the forces exerted on the turbine nozzle vanes by the gas flow coming from the combustion chamber being taken up by the portions of the connection ferrules that extend between the combustion chamber and turbine nozzle assembly and the metal shrouds.

Thus, the connection ferrules can be designed merely to hold the combustion chamber and HP turbine nozzle assembly between the metal shrouds, without any requirement to withstand circumferential or shear forces.

Advantageously, locking members are provided which co-operate with a wall portion secured to the metal shroud and an annular flange of the turbine nozzle. The wall portion secured to the metal shroud can then be in the form of a radial flange. In particular, the locking members may act on a radial flange secured to a metal casing and a radial flange secured to the turbine nozzle, with an annular sealing gasket being housed between them, and can then include axial rods for retaining the sealing gasket.

In another particular embodiment, the radial flange secured to the turbine nozzle is carried by a connection ferrule at an end thereof which is fastened to the turbine nozzle.

Advantageously, in order to distribute forces better, first locking members are provided that act between a radial flange secured to the inner metal shroud and an inner radial flange secured to the turbine nozzle, and second locking members are provided that act between a radial flange secured to the outer metal shroud and an outer radial flange secured to the turbine nozzle.

Also advantageously, downstream end portions of the combustion chamber are held between the platforms of the turbine nozzle vanes and end portions of the connection ferrules by fastener members interconnecting the connection ferrules, the combustion chamber, and the turbine nozzle.

The invention is applicable to gas turbines having combustion chambers made either of CMC or of a refractory metallic material. Similarly, the connection ferrules may be made of a metallic material, or at least in part out of CMC.

BRIEF DESCRIPTION OF THE DRAWINGS

The invention can be better understood on reading the following description given by way of non-limiting indication and made with reference to the accompanying drawings, in which.

DETAILED DESCRIPTION OF EMBODIMENTS

Figure 1:
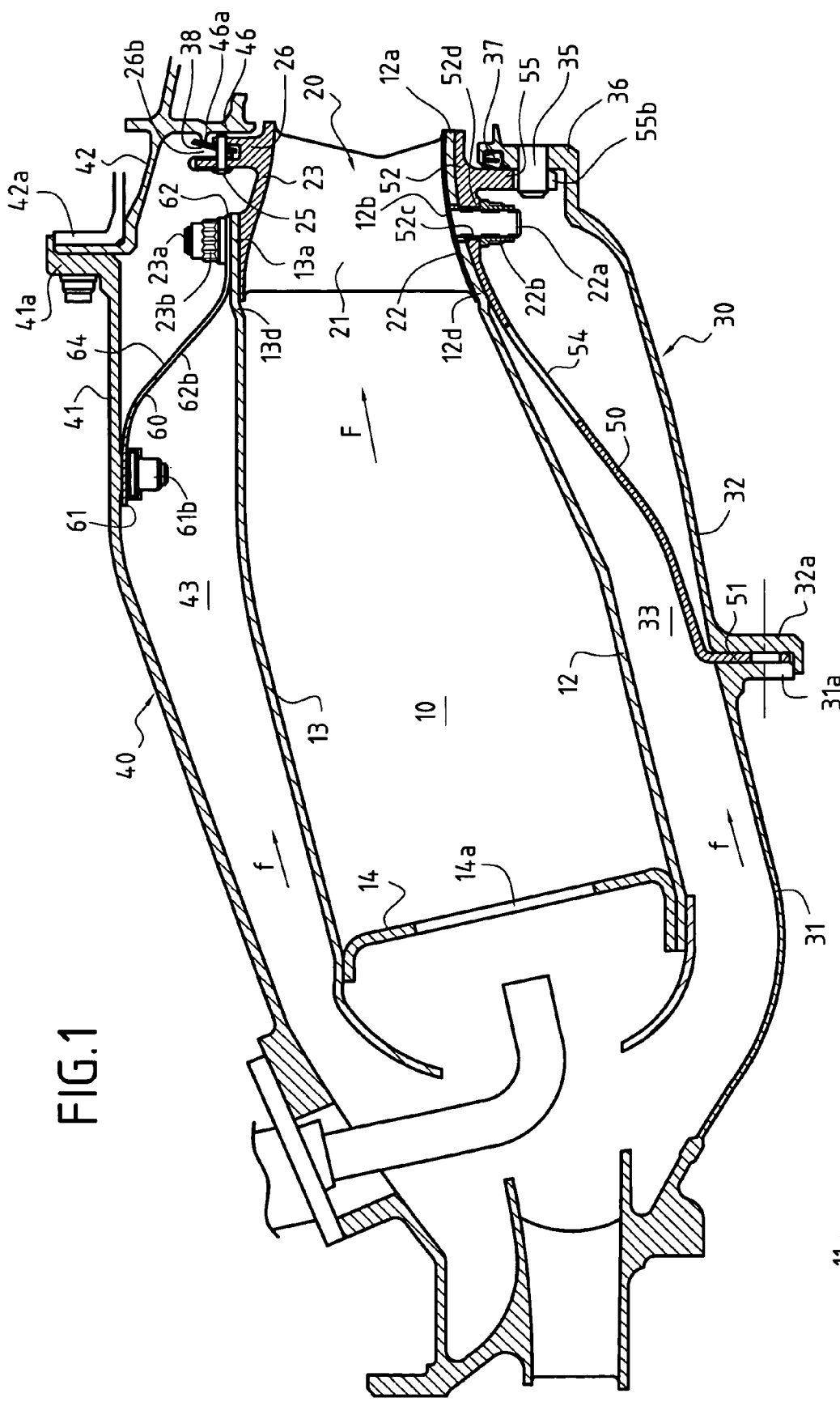
FIG. 1 is a diagrammatic axial half-section showing a portion of a gas turbine.

FIG. 1 is an axial half-section of a gas turbine comprising an annular combustion chamber 10, a high pressure turbine nozzle 20 mechanically connected to a downstream end portion of the chamber 10, inner and outer annular metal shrouds 13 and 14, and connection ferrules 50 and 60 holding the assembly constituted by the chamber 10 and the nozzle 20 in the space defined between the shrouds 30 and 40.

The combustion chamber 10 is defined by an inner annular wall 12 and an outer annular wall 13 having a common axis 11, and by an upstream end wall 14 secured to the annular walls 12 and 13. In well-known manner, the end wall 14 presents a series of orifices 14a distributed around the axis 11 to receive injectors enabling fuel and oxidizer to be injected into the combustion chamber.

Figure 2:
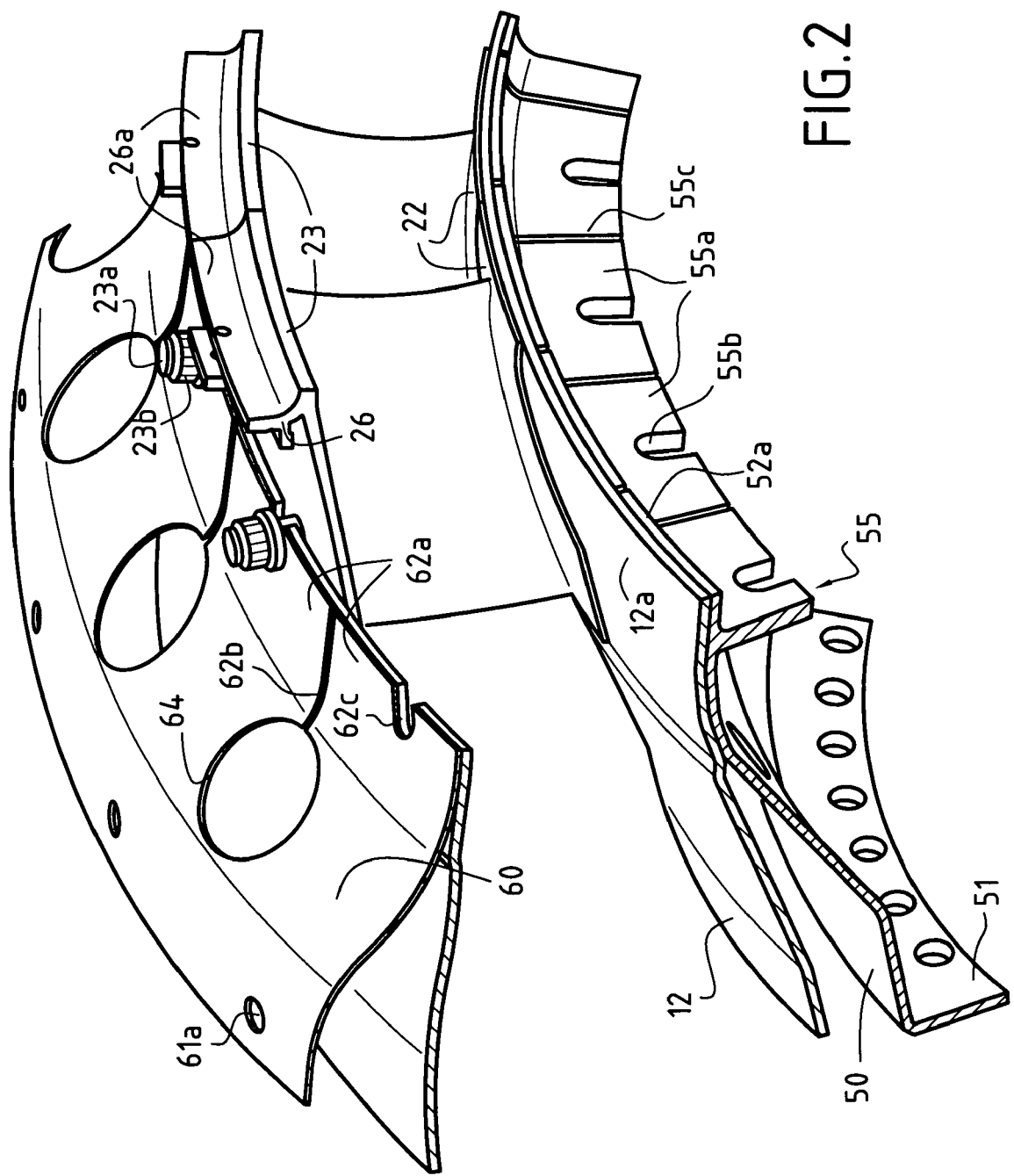
FIGS. 2 and 3 are fragmentary perspective views showing how the downstream end portion of the combustion chamber is assembled with the HP turbine nozzle and the connection ferrules in the FIG. 1 gas turbine.
Figure 3:
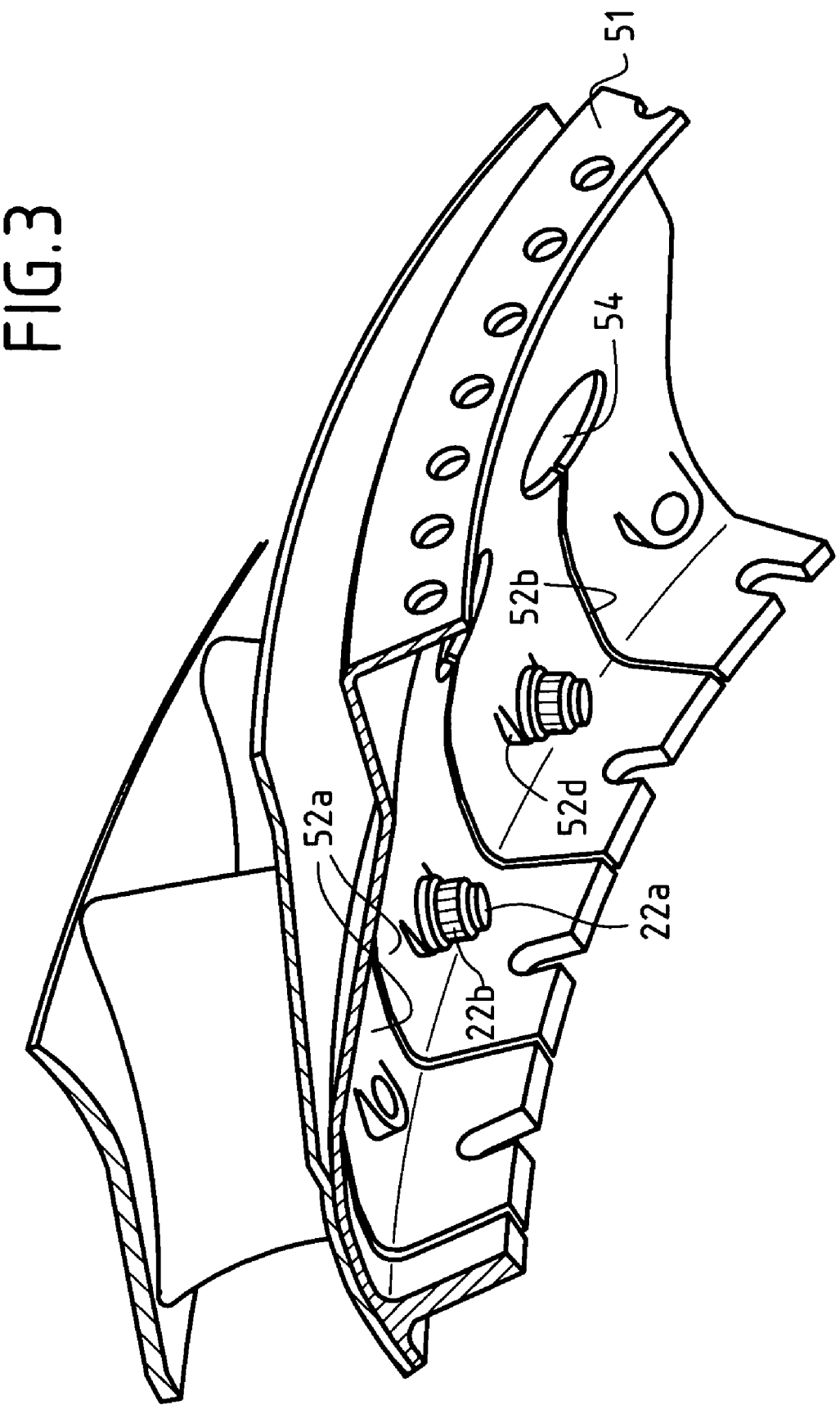

The HP turbine nozzle 20, which constitutes the inlet stage of the turbine, comprises a plurality of stationary vanes angularly distributed around the axis 11. As shown in FIGS. 2 and 3, the vanes comprise airfoils 21 having their ends secured to inner and outer platforms 22 and 23 in the form of juxtaposed ring sectors. The inside faces of the platforms 22 and 23 define the path for the flow of gas through the nozzle. Each pair of platforms 22 and 23 may be associated with one or more airfoils.

The inner metal shroud 30 comprises two portions 31 and 32 united by bolting together respective inwardly-directed flanges 31a and 32a. Similarly, the outer metal shroud 40 is in two portions 41 and 42 united by bolting together respective outwardly-directed flanges 41a and 42a. The space 33 between the inner wall 12 of the chamber 10 and the inner shroud 30, and the space 43 between the outer wall 13 of the chamber 10 and the outer shroud 40 both carry respective secondary flows of cooling air (arrows f) flowing around the chamber 10.

In the example shown, the inner connection ferrule 50 presents a first end 51 in the form of a flange which is connected to the inner shroud 30 by being clamped between the flanges 31a and 32a and by being bolted together therewith. At its other end 52, the ferrule 50 is connected to the downstream end portion 12a of the inner wall 12 of the chamber 10. On the portion extending in the space 33, the ferrule 50 has a curved shape that is of substantially S-shaped section so as to present the flexibility required to accommodate radial differential expansion between the chamber 10 and the shroud 30, in particular when the chamber 10 is made of CMC.

With a CMC chamber in particular, the ferrule 50 is sectorized to form a plurality of tabs 52a extending from its end 52 and over a certain distance towards its other end 51. This sectorization can be achieved by means of slots 52b separating the tabs 52a and extending between the end 52 and holes 54 that are formed through the ferrule 50 and that are angularly distributed around the axis 11 so as to allow a flow of secondary air to pass into the space 33. The slots 52b serve to accommodate differential expansion in a circumferential direction.

In the example shown, the connection ferrule 60 presents a first end wall 61 secured to the inner wall of the outer shroud 40. For this purpose, the end portion 61 of the ferrule 60 presents holes 61a that are engaged on threaded rods angularly distributed around the axis 11 on the inside wall of the shroud 40, and fastening is achieved by means of nuts 61b. At its other end 62, the ferrule 60 is connected to the downstream end portion 13a of the outer wall 13 of the combustion chamber 10. On the portion extending in the space 43, the ferrule has a curved shape with a section that is substantially S-shaped in order to present the flexibility required for accommodating differential expansion between the shroud 40 and the chamber 10, in particular when the chamber is made of CMC. With a CMC chamber in particular, the ferrule 60 is also sectorized into a plurality of tabs 62a in a manner similar to the ferrule 50. Thus, slots 62b separate the tabs 62a, extending from the end 62 of the ferrule over a certain distance towards the other end 61, e.g. as far as holes 69 enabling the secondary flow to pass through the space 43.

When the combustion chamber walls are made of a refractory metallic material, it need not be necessary to sectorize the ferrules 50 and 60.

Naturally, the end 61 of the ferrule 60 may be connected to the shroud 40 via the connection between the flanges 41a and 42a in the same manner as the end 51 of the ferrule 50. Likewise, it would also be possible to connect said end 51 of the ferrule 50 to the inner shroud 30 at a location other than that of the flanges 31a and 32a.

Both on the inside and on the outside, it is advantageous to use the same fastener means for mechanically connecting the downstream end portions of the chamber 10, the sectorized end portions of the connection ferrules, and the platforms of the nozzle 20.

In the example shown, the connection means comprise threaded rods 22a extending radially inwards from the platforms 22 and that are secured thereto, and threaded rods 23a that extend radially outwards from the platforms 23 and that are secured thereto.

The inner wall 12 of the chamber 10 has its downstream end portion 12a pressing against the outer faces of the platforms 22, substantially all the way to the downstream edges thereof. For this purpose, holes 12b are formed through the end portion of the chamber in order to pass the threaded rods 22a. In similar manner, the end portion 52 of the ferrule 50 comes to bear against the outer face of the end portion 12a of the combustion chamber, with holes 52c being formed through the tabs 52a in order to pass the threaded rods 22a. Fastening is achieved by means of nuts 22b engaged on the threaded rods and clamping together the platforms 22, the end portion 12 of the chamber, and the tabs 52a by pressing against bosses 52d formed on the tabs 52a and having holes 52c passing therethrough.

The outer wall 13 of the chamber has its downstream end portion 13a pressing against a portion of the outside faces of the platforms 23, with notches 13b being formed in the end portion 13a in order to pass the threaded rods 23a. The end portion 62 of the ferrule 60 presses against the outside face of the end portion 13a of the outer wall 13 of the chamber, with notches 62c enabling the wall to be assembled being formed in the tabs 62b in order to pass the threaded rods 23a. Nuts 23b engaged on the threaded rods 23a clamp together the platforms 23, the end portion 13 of the chamber, and the tabs 62a by pressing against the tabs.

It should be observed that the connection between the chamber 10 and the nozzle 20 enables good sealing to be achieved at the interface between them. In addition, in order to ensure good continuity of the primary gas flow stream coming from the chamber 10 (arrow F), small setbacks 12d and 13d are provided at the connection between the end portions 12a and 13a and the remainder of the walls 12 and 13, as can be seen in FIG. 1. Thus, the path provided for the stream leaving the chamber can connect substantially without discontinuity with the path followed by the stream in the nozzle.

Aligned orifices (not shown) are formed in the platforms 22 and 23 and communicate with orifices formed in the end portions 12 and 13 of the chamber wall 10 and in the tabs 52a and 62a of the connection ferrules so as to allow cooling air from the spaces 33 and 43 to pass towards the stationary vanes 21 of the nozzle 20.

According to a characteristic of the invention, locking members are provided to prevent the nozzle 20 from turning without that leading to circumferential or shear forces being applied to the portions of the connection ferrules 50 and 60 that extend in the spaces 33 and 43.

In the embodiment of FIGS. 1 and 3, the locking members are constituted by fingers 35 secured to the inner shroud 30 and penetrating into radial notches 55b formed in a flange 55 secured to the nozzle 20. In the example shown, the fingers 30 extend axially and are angularly distributed around the axis 11, being carried by a radial flange 36 secured to the shroud 30 substantially level with the downstream end of the nozzle 20. The fingers 35 may be secured to the flange 36 by being force-fitted in holes formed through the flange 36, or they may be welded thereto. Still in the example shown, the flange 55 is a sectorized flange, with the sectors 55a forming this flange being secured to the sectors 52a of the ferrule 50 in the vicinity of the downstream end thereof, and downstream from the connection between the ferrule 60 and the nozzle 20, such that the sectors 55a are indeed secured to the inside platforms 22 of the nozzle.

It should also be observed that the downstream end of the space 30 is sealed by means of an "omega" type annular gasket 37 received in a groove of the flange 36 and bearing against the flange 55, the flanges 36 and 55 thus serving both to support the sealing gasket and to support the means for preventing the nozzle from turning.

In a variant, the axial locking fingers could be carried by the flange 55 and penetrate in housings such as blind oblong holes formed in the flange 36.

On the outside, the downstream end of the space 43 is sealed by a strip gasket 38 whose base is held in an annular housing 26b opening radially outwards and formed in the tip of an annular flange 26. The flange comprises sectors 26a secured to the outside platforms 23 in the vicinity of the downstream end of the nozzle 20. The gasket 38 is held by means of pins 25 passing through the sides of the housing 26b in an axial direction. The gasket 38 bears against a rib 46a formed on a radial flange 46 secured to the shroud 40 at the downstream end of the nozzle 20.

In operation, the forces exerted on the airfoils 21 of the nozzle 20 by the flow of gas coming from the chamber 10 are taken up by the fingers 35 via the threaded rods 22a and the flange 55, with no circumferential force being imparted to the ferrules 50 and 60. The ferrules therefore do not need to be overdimensioned. It is even possible to envisage making them out of CMCs when the chamber is itself made of CMC. Sectorizing the ferrules is then no longer necessary at the connection with the combustion chamber, but it may be desirable at the connections with the inner and outer metal shrouds.

Figure 4:
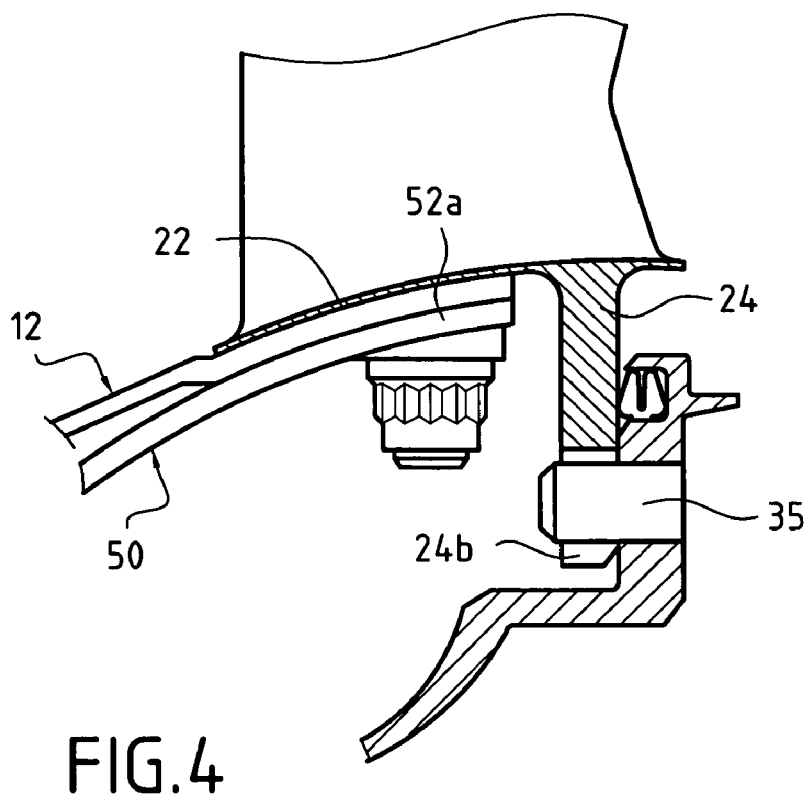
FIGS. 4 to 6 are detail views showing variant embodiments of the means for preventing the HP turbine nozzle from turning.

FIG. 4 shows another embodiment which differs from that of FIGS. 1 to 3 in that the fingers 35 are engaged in notches 24b formed in a sectorized flange 24 secured directly to the inside platforms 22, a notch being formed in each sector of the flange corresponding to an inside platform 22. Under such circumstances, the downstream ends of the inner wall 12 of the chamber 10 and the tabs 52a of the ferrule 50 are set back from the downstream end of the nozzle 20, in the same manner as the downstream ends of the outer wall 13 of the chamber 10 and the tabs 62a of the ferrule 60.

Figure 5:
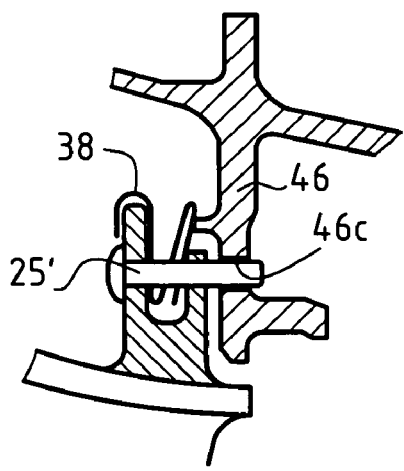

FIG. 5 shows another embodiment which differs from that of FIGS. 1 to 3 in that the nozzle 20 is also prevented from turning via the outside platforms 23.

Advantageously, this is done by means of the pins 25' for holding the gasket 38, by extending the pins downstream so that they penetrate into the holes 46c formed in the flange 46. The pins 25' may optionally be overdimensioned, i.e. of diameter greater than would be required merely for holding the sealing gasket 38.

Figure 6:
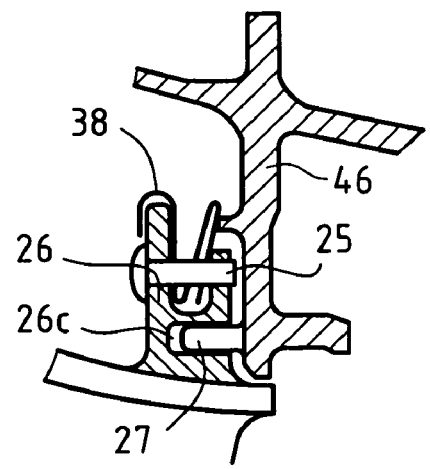

The embodiment of FIG. 5, with turning being prevented via both the inside and the outside platforms of the nozzle, is advantageous in that it enables the forces transmitted between the nozzle and the metal shrouds to be distributed. Naturally, for the purpose of preventing the nozzle from turning, it is possible to provide a configuration for the outside platforms similar to that used in the embodiment of FIG. 4 for the inside platforms, i.e. locking fingers 27 carried by the flange 46 penetrating into blind oblong holes 26c in the flange 26, as shown in FIG. 6.

What is claimed is:

1. A gas turbine comprising:
    an annular combustion chamber having a wall made of ceramic matrix composite material;
    a high pressure turbine nozzle having a plurality of stationary vanes distributed around an axis coinciding with the axis of the combustion chamber, the turbine nozzle being mechanically connected to a downstream end portion of the combustion chamber so as to from an assembly together therewith;
    inner and outer metal shrouds between which the assembly constituted by the combustion chamber and the turbine nozzle is housed;
    flexible inner and outer connection ferrules connecting the combustion chamber and turbine nozzle assembly respectively to the inner and outer metal shrouds so as to support said assembly between the shrouds; and
    locking members preventing the turbine nozzle from turning about its own axis relative to at least one of the metal shrouds so as to avoid the forces that are exerted on the turbine nozzle vanes by the flow of gas from the chamber being taken up by the portions of the connection ferrules that extend between the combustion chamber and turbine nozzle assembly and the metal shrouds.

2. A gas turbine according to claim 1, wherein the locking members co-operate with a wall portion secured to a metal shroud, and a flange secured to the turbine nozzle.

3. A gas turbine according to claim 2, wherein the wall portion secured to the metal shroud is in the form of a radial flange.

4. A gas turbine according to claim 2, wherein the locking members act on a radial flange secured to a metal shroud and a radial flange secured to the turbine nozzle between which there is housed an annular sealing gasket.

5. A gas turbine according to claim 4, wherein the locking members comprise axial rods for retaining the sealing gasket.

6. A gas turbine according to claim 2, wherein the flange secured to the turbine nozzle is carried by a connection ferrule at an end thereof that is fastened to the turbine nozzle.

7. A gas turbine according to claim 2, wherein first locking members are provided acting between a radial flange secured to the inner metal shroud and an inner radial flange secured to the turbine nozzle, and second locking members are provided acting between a radial flange secured to the outer metal shroud and an outer radial flange secured to the turbine nozzle.

8. A gas turbine according to claim 1, wherein downstream end portions of the combustion chamber are clamped between platforms of the turbine nozzle vanes and end portions of the connection ferrules by fastener members connecting together the connection ferrules, the combustion chamber, and the turbine nozzle.

9. A gas turbine according to claim 1, wherein the connection ferrules are made at least in part out of a ceramic matrix composite material.

* * * * *